United States Patent
Arora et al.

(10) Patent No.: US 10,356,721 B1
(45) Date of Patent: Jul. 16, 2019

(54) COMMUNICATION-HUB SELECTION TECHNIQUES

(71) Applicant: Amazon Technologies, Inc., Seattle, WA (US)

(72) Inventors: Nitin Arora, Woodland Hills, CA (US); Zoe Adams, Orange County, CA (US); Apoorv Naik, San Diego, CA (US); Scott Edward Van Vliet, Coto de Caza, CA (US)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 15/627,211

(22) Filed: Jun. 19, 2017

(51) Int. Cl.
 H04W 4/08 (2009.01)
 H04W 52/02 (2009.01)
 H04W 48/16 (2009.01)
 H04W 84/12 (2009.01)

(52) U.S. Cl.
 CPC ....... *H04W 52/0261* (2013.01); *H04W 48/16* (2013.01); *H04W 84/12* (2013.01)

(58) Field of Classification Search
 CPC .......................... H04L 65/102; H04W 8/183
 See application file for complete search history.

(56) References Cited

U.S. PATENT DOCUMENTS

| | | | | |
|---|---|---|---|---|
| 8,621,056 | B2* | 12/2013 | Coussemaeker | H04W 12/08 709/223 |
| 2014/0004793 | A1* | 1/2014 | Bandyopadhyay | H04L 63/0428 455/41.1 |
| 2015/0065148 | A1* | 3/2015 | De Pasquale | H04W 4/08 455/445 |
| 2018/0041072 | A1* | 2/2018 | Clifton | H02J 3/14 |
| 2018/0220353 | A1* | 8/2018 | Mendiola | H04B 7/15 |

* cited by examiner

*Primary Examiner* — Zhiren Qin
(74) *Attorney, Agent, or Firm* — Lee & Hayes, P.C.

(57) ABSTRACT

This disclosure describes systems, devices, and techniques for selecting a device in an environment to act as a communication hub for other devices in the environment. For instance, an environment may include two or more devices that are configured to communicate with one another as well as with remote resources (e.g., Internet-available resources, etc.). In one example, the devices each include a first radio configured to communication over a wireless local area network (WLAN) and a second radio configured to communicate over a short-range wireless communication network, such as Bluetooth, ZigBee, Z-Wave, or the like. A device having a highest battery life may be selected as the communication hub for the devices, such that the other non-hub devices may therefore route messages through the hub using their short-range radios. In addition, the non-hub devices may power off their WLAN radios, thus conserving battery life of these devices.

20 Claims, 12 Drawing Sheets

US 10,356,721 B1

COMMUNICATION-HUB SELECTION TECHNIQUES

BACKGROUND

Homes are becoming more connected with the proliferation of computing devices such as desktops, tablets, entertainment systems, and portable communication devices. These devices often communicate with one another and with remote computing resources for providing output (e.g., audio, videos, etc.) in the environments in which these devices reside. While some of these devices receive constant power (e.g., are "plugged in" to a power supply), some of these devices operate on batteries. In the latter instances, users desire longer and longer battery lives. Discussed herein are technological improvements for, among other things, these computing devices and systems involving the computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
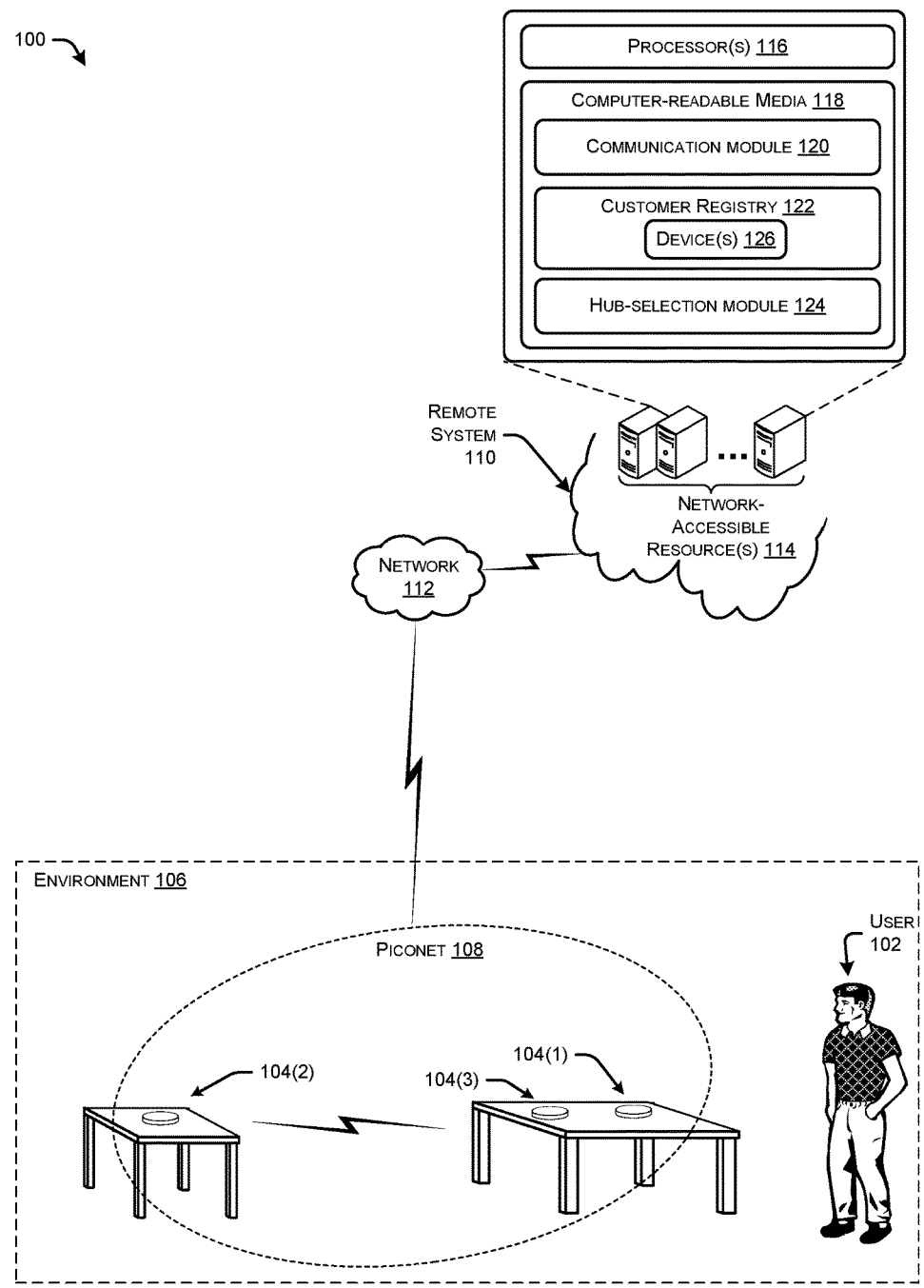
FIG. 1 is a conceptual diagram of an illustrative environment that includes multiple devices that are capable of communicating with one another and with remote computing resources over a network. In this architecture, the devices select one device to act as a communication hub for each of the devices in the environment, thereby allowing other "slave" devices to turn off their respective wireless radios or place the wireless radios in a low-power mode, thus conserving battery lives of these devices.

This disclosure describes systems, devices, and techniques for selecting a device in an environment to act as a communication hub for other devices in the environment. For instance, an environment may include two or more devices that are configured to communicate with one another as well as with remote resources (e.g., Internet-available resources, etc.). In one example, the devices each include a first radio configured to communication over a broader network, such as a local area network (LAN), a wide area network (WAN), or the like, while also including a second radio configured to communicate over a short-range wireless communication network, such as Bluetooth, ZigBee, Z-Wave, or the like. For instance, the devices may include a first radio configured to communicate over a wireless LAN (WLAN) and a second radio configured to communicate over a personal area network (PAN). Stated differently, the devices may include a radio configured to communicate according to IEEE 802.11 specifications and a second radio configured to communicate over IEEE 802.15 specifications, for example. In some instances, one or more of the devices may include a single radio configured to communicate via two different protocols.

In some instances, one of the devices in the environment may be selected to act in whole or in part as a communication hub for the other devices in the environment. For instance, when a first device is selected as the communication hub, a second device (and potentially other devices) may route messages through the first device. For instance, the second device may power down its WLAN radio and may route messages intended for remote resources through the first device. That is, if the second device is to send a message to one or more remote resources located outside of the environment of the devices, the second device may send the message to the first device using the short-range radio of the second device. The first device may receive this message via its short-range radio and may then send along the message to the remote resources using the WLAN radio of the first device. Further, if the remote resources provide a response to the message, the first device may receive the response via the WLAN radio of the first device. The first device may then use its short-range radio pass the response along to the second device. In instances where the devices include single antennas configured to communicate via different protocols, the first device may receive the message via a first protocol and then send along the message to the remote resources using a second, different protocol. The first device may then receive a response from the remote resources using the second protocol and may send the response back to the second device via the first protocol. Of course, while the above example describes powering down the WLAN radio and utilizing the short-range radio, in other instances the converse may be true. In some instances, the radio that uses less power from the battery (e.g., the short-range radio in some instances) may be used and the radio that uses more power from the battery may be powered down (e.g., the WLAN radio in some instances). For instance, a radio that uses a higher-power protocol may be powered down while another radio that uses a lower-power protocol may remain powered on.

In yet another example, each device may include a single radio that is configured to communicate via multiple protocols, such as a first protocol that requires more power from a battery than does a second protocol. In these instances, the device that is selected as the communication hub may communicate with remote resources via the first protocol and may communicate with the other devices in the environment via the second, lower-power protocol. In some cases, the first protocol and the second protocol may only differ based on the number of devices to which the respective device connects. For example, in an environment that includes five devices, a communication hub may couple to each other four devices as well as to the remote resources, while the each other device in the environment may only couple to the communication hub. Therefore, even though each of the five devices in the environment utilizes the same protocol, the communication hub couples to more devices than the other devices in the environment and, thus, utilizes more power from its respective battery than the other devices. In these instances, the power savings may occur from simply selecting one device to communicate with the remote resources on behalf of each device in the environment, even though each device utilizes the same type of communication protocol.

In some instances, one or more of the devices in the environment may comprise battery-powered devices. In these instances, the respective battery lives of the devices may be used in determining which device is to act as the communication hub. For example, the device having the highest battery life may be selected as the communication hub in some instances. In other instances, other factors may be taken into account, such as the ranked importance of the device (e.g., as programmed by a user), a respective connection strength of the devices to the WLAN, time-of-day, device types, whether devices are currently executing a process or waiting for a response, and/or the like. For instance, a device having a best connection strength to the WLAN may be selected as the hub. In another example, multiple factors may be weighted and combined to select the hub. For example, a first weight may be applied to the battery life of a device, a second weight to the connection strength, and so forth. The device having the highest weighted sum (e.g., of the battery life and connection strength) may be selected as the communication hub. For instance, a cost function for determining the communication hub may be based, for example, seven-tenths on the battery level of each device and three-tenths on the connection strength to the WLAN of each device. Furthermore, in some instances, certain factors may be used as a threshold for determining devices eligible to be selected as a communication hub. For example, a device may need to have a certain battery life (e.g., 50% remaining, etc.) and/or a certain connection strength (e.g., RSSI measurement) to qualify for selection as a communication hub for the multiple devices.

In some instances, each device in an environment, such as those devices in a piconet, may initially generate a battery-level message for messaging information regarding its battery level to the other devices in the environment. For instance, each device may generate a respective message that indicates a value of that device's currently battery level of the device (e.g., specified in percentage of potential energy remaining, length of time remaining, etc.), a device identifier (DID) of the device, a service-set identifier (SSID) of the WLAN to which the device connects, whether the device includes a WLAN radio (i.e., whether the device is WiFi enabled), whether the device is configured to act as a communication hub, a random number to acts as a tie-breaker, and/or the like. After each device sends its own battery-level message and receives messages from the other devices in the environment, each device may generate a battery map for use in selecting the communication hub. For instance, each device may begin by filtering out those devices that are not WiFi enabled, that are not allowed or configured to act as the hub, that do not connect to the same WLAN as the device (as determined by the SSID), and/or the like. Of the remaining devices, the battery map may determine which device has a highest remaining battery life.

If a device is in fact the device having a highest remaining battery life, that device may send a hub-selection message to each other device in the environment to indicate that it is to act as the communication hub for the devices. In some instances, this message may also indicate an amount of time for which the device is to act as the hub. This time may be a fixed time, a time based on a battery life of the device, based on a difference between the battery lives of the devices, based on a number of device in the environment and able to act as the hub, based on types of devices in the environment and/or the like. Each device that receives the message (i.e., "slave devices") may then store an indication of the DID of the device that is to act as the communication hub and may also start a timer corresponding to the amount of time for which the device is to act as the hub. In another example, meanwhile, these devices may refrain from setting a timer and may instead rely on the communication hub to indicate when the amount of time has expired.

Further, upon receiving the hub-selection message, the slave devices may power off or place in a low-power mode their respective WLAN radios for the purpose of conserving battery life of each respective device. Therefore, during the amount of time for which the device acts as the communication hub, the slave devices may communicate with remote resources using the communication hub. That is, these slave devices may send outbound messages to the communication hub using short-range radios and may receive inbound messages via these short-range radios.

Further, upon the expiration of time, each device may again determine its battery life, SSID of the network to which the device connects, etc. and may send a battery-life message to the other devices. The same or a different device may then be selected as the communication hub and may relay messages to and from remote resources on behalf of the slave devices. Further, while the following examples describe the devices as self-selecting the communication hub, in other instances another actor may make this selection. For instance, in some instances each device may send its battery-life message to a remote resource, which may in turn make the communication-hub selection and either directly send this selection to each of the devices or send this indication to one or more devices (e.g., the selected device) for sending to the remaining devices.

In instances where two or more devices have a battery life that is sufficiently close to one another, a tiebreaker may be used to determine which device is to act as the communication hub. For instance, if two devices have substantially the same battery life (e.g., the same percentage remaining, which five percentage points of one another, etc.), then the generated random number may be used to determine the communication hub. For example, the device that generated the highest random number (of the devices tied for the highest battery life remaining) may be selected as the hub and may send the hub-selection message to the other devices. Of course, while the above example discusses using the random number of make this selection, it is to be appreciated that multiple other tiebreakers could be used. Further, it is to be appreciated that the random number may be within some predefined range, may be globally unique relative to the all of the devices, may be a set number for each device each time (to avoid an occurrence where two or more devices generate the same random number), or the like. Further, in other instances other tiebreakers may be used, such as rotating the tiebreaking device in a round-robin fashion, using device IDs as a tiebreaker, or the like.

In some instances, a new device may join the piconet after a device has been selected as the communication hub. In these instances, the device may begin sending its information (e.g., battery level, connection strength, etc.) to the other devices while communicating with remote resources when needed. That is, the new device may act as its own communication hub while continuing to send out the information used for selecting a communication hub. Upon expiration of the predefined amount of time, each device in the piconet may again begin sending out its information (e.g., battery level, connection strength, etc.), at which point a new communication hub may be selected from the piconet, which now includes the newly added device.

FIG. 1 is a conceptual diagram of an architecture 100 that includes a user 102 and multiple devices 104(1), 104(2), and 104(3) (collectively, "devices 104") in an illustrative environment 106, with the devices coupling with one another over a short-range wireless network and thus collectively forming a piconet 108. In the illustrated example, each of the devices 104 comprise devices configured to communicate both with one another over a short-range connection as well as over a network 112. In some instances, the devices 104 may comprise relatively WiFi connected devices that each includes a button that, when selected, performs one or more actions, such as ordering a consumer good or other item to be delivered to the environment 102. Of course, while the examples illustrated and described herein describe one example embodiment of the devices 104, the techniques may apply to another range of devices, such as tablet computing devices, voice-controlled devices, televisions, smart watches, mobile telephones, laptop computers, or the like. As described below, if the user 102 presses a button of the device 104(3), the device 104(3) may send a command to a remote service 110 over the network 112 if the device 104(3) is currently configured as the communication hub for the piconet 108. If not, then the device 104(3) may route the command to another device in the piconet 108, which then communicates the command to the remote service 110 over the network 112.

The network 112 may represent an array or wired networks, wireless networks (e.g., WiFi), or combinations thereof. The remote system 110, meanwhile, may generally refer to a network-accessible platform—or "cloud-based service"—implemented as a computing infrastructure of processors, storage, software, data access, and so forth that is maintained and accessible via the network 112, such as the Internet. Cloud-based services may not require end-user knowledge of the physical location and configuration of the system that delivers the services. Common expressions associated with cloud-based services, such as the remote system 110, include "on-demand computing", "software as a service (SaaS)", "platform computing", "network accessible platform", and so forth.

As illustrated, the remote service 110 may comprise one or more network-accessible resources 114, such as one or more server computing devices that include one or more processors 116 and computer-readable media 118. The computer-readable media 118 may include volatile random access memory (RAM), non-volatile read only memory (ROM), non-volatile magnetoresistive (MRAM) and/or other types of memory. The resources 114 may also include a data storage component, for storing data and controller/processor-executable instructions. Each data storage component may individually include one or more non-volatile storage types such as magnetic storage, optical storage, solid-state storage, etc. The resources 114 may also be connected to removable or external non-volatile memory and/or storage (such as a removable memory card, memory key drive, networked storage, etc.) through respective input/output device interfaces. Computer instructions for operating each resource and its various components may be executed by the respective device's processor(s) 116, using the computer-readable media 118 as temporary "working" storage at runtime. These computer instructions may be stored in a non-transitory manner in non-volatile memory, storage, or an external device(s). Alternatively, some or all of the executable instructions may be embedded in hardware or firmware on the respective device in addition to or instead of software.

As illustrated, the computer-readable media 118 may store or otherwise have access to a communication module 120, a customer registry 122, and a hub-selection module 124. The communication module 120 may generate data for communicating with one or more of the devices 104(1)-(3) and may store a current indication of the particular device in the piconet 108 acting as the communication hub for use in determining how to relay messages to the different devices in the environment. For instance, if the device 104(1) is the current communication hub, the communication module 120 may store a corresponding indication in memory.

The customer registry 122, meanwhile, may store an array of information about different user accounts associated with the remote service 110. For instance, the customer registry 122 may store an indication of one or more devices 126 associated with different user accounts, such as an account of the user 102. In one example, the customer registry 122 may store an indication that the user account of the user 102 is associated with the devices 104(1)-(3). In further instances, the customer registry 122 may store an indication of different piconets associated with the account of the user 102. For example, the customer registry 122 may store an indication of the piconet 108 and the devices 104(1)-(3) therein, and may also store the indication of the current communication hub for reference by the communication module.

Finally, the computer-readable media 118 may store a hub-selection module 124, which may function to periodically, randomly, or on a one-time basis select a communication hub for the environment 106. For instance, the hub-selection module 124 may receive information from the devices, such as the battery-life messages of these respective devices, for determining which device is to act as the communication hub. As noted, these messages may include an indication of a battery level or life of a respective device, potentially along with other information, such as a connection strength of the respective device to a WLAN, a name or other identifying information of a WLAN to which the device connects, an identifier of device, or the like. The hub-selection module 124 may then send an indication of the DID of the selected device to one or more devices in the environment 106, which may in turn store an indication of the current hub. In one instance, the module 124 sends this indication to each device, while in another example, the module 124 sends this indication to the selected device or another device for propagating to the other devices in the environment via a short-range wireless connection. Further, while FIG. 1 shows the hub-selection module 124 as residing at the remote service 110, in other instances the hub-selection module may additionally or alternatively reside locally on one or more of the devices 104(1)-(3), as described in detail below.

Regardless of where the hub selection occurs, the architecture 100 allows for a single device to act as a communication hub for one or more other devices, thereby allowing other "slave" devices to turn off their respective wireless radios or place the wireless radios in a low-power mode, thus conserving battery lives of these devices.

Figure 2:
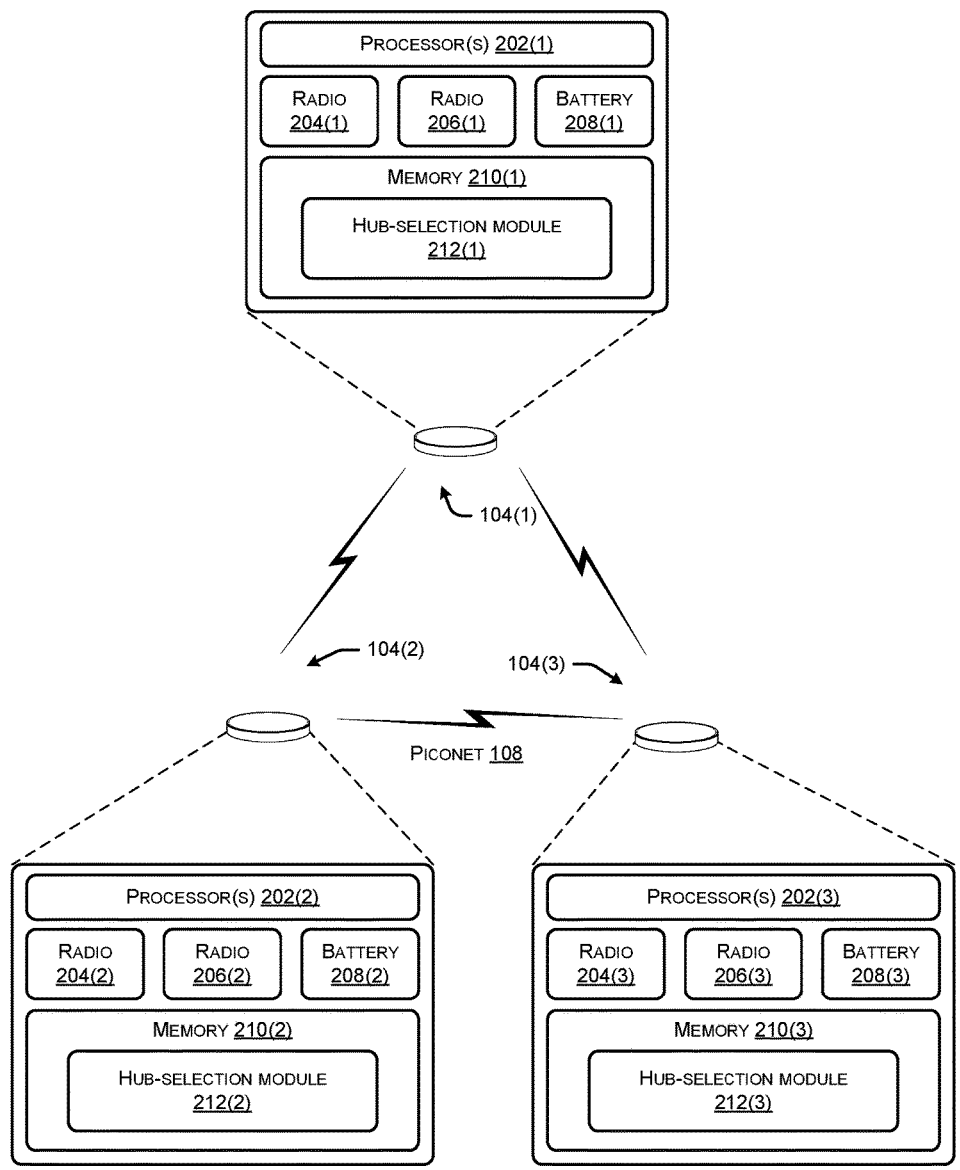
FIG. 2 illustrates example components of the devices of FIG. 1. As illustrated, each device includes a first radio for communicating over a wireless network (e.g., LAN, WAN, etc.), a second radio for communicating over a short-range wireless connection, and a hub-selection module for determining which device is to act as a communication hub for the devices. The devices that are not selected as the communication hub may therefore send and receive messages through the communication hub using the second radio and may turn off or power down the first radio. Powering down the first radio (or any other radio) may include powering off the radio, placing the radio in a lower-power state (e.g., sleep, idle, hibernate, etc.), or otherwise reducing the power sent to and/or consumed by the radio in any other manner.

FIG. 2 illustrates example components of the devices 104(1)-(3) of FIG. 1. As illustrated, each device includes one or more processors 202(1), 202(2), and 202(3), a respective first radio component 204(1), 204(2), and 204(3) for communicating over a wireless network (e.g., LAN, WAN, etc.), and a respective second radio component 206(1), 206(2), and 206(3) for communicating over a short-range wireless connection. As used herein, a "radio" and "radio component" may be used interchangeably. In some instances, the devices include any other number of radios, including instances where the devices comprise a single radio configured to communicate over two or more different protocols.

In addition, each device may include a respective battery 208(1), 208(2), and 208(3). At any given time, each battery may have a particular battery life or level, representing a current charge of the battery. The battery life or level may be measured in any suitable manner, such as by a percentage of charge remaining, an amount of time remaining, or the like. While the techniques described herein are described with reference to devices powered by batteries, it is to be appreciated that the techniques may also apply to devices that receive constant power.

In addition to the above, the devices 104(1)-(3) may include respective memory (or "computer-readable media") 210(1), 210(2), and 210(3), which may store respective instances of a hub-selection module 212(1), 212(2), and 212(3). The hub-selection modules 212(1)-(3) may generate messages (e.g., battery-life messages, communication-strength messages, etc.) and one or more maps (e.g., battery-life maps, communication-strength maps, etc.), and may be used to select/determine the communication hub. Further, the hub-selection modules 212(1)-(3) may send and/or receive the hub-selection messages and store an indication of the selected hub and the amount of time for which the selected device is to be act as the hub. The hub-selection modules 212(1)-(3) may also set a timer for determining the amount of time for which the selected device is to act as a hub, or may otherwise determine when the time for the device to act as the hub has elapsed.

In some instances, the messages sent by each device indicate a current battery level of the device (also referred to as a "battery level value"), a current connection strength to the WLAN of the device, information identifying the WLAN, information identifying the device, and/or the like. With this information, the each hub-selection module 212(1)-(3) may determine the device that is to be selected as the communication hub. In some instances, the modules 212(1)-(3) implement an algorithm that selects the device having the highest battery level remaining as the communication hub. In other instances, the modules 212(1)-(3) select the device having the highest connection strength as the communication hub. In still other instances, each module is configured to implement a cost function that selects the communication hub based on one or more weighted factors, such as current battery levels, connection strengths, and so forth.

Figure 3:
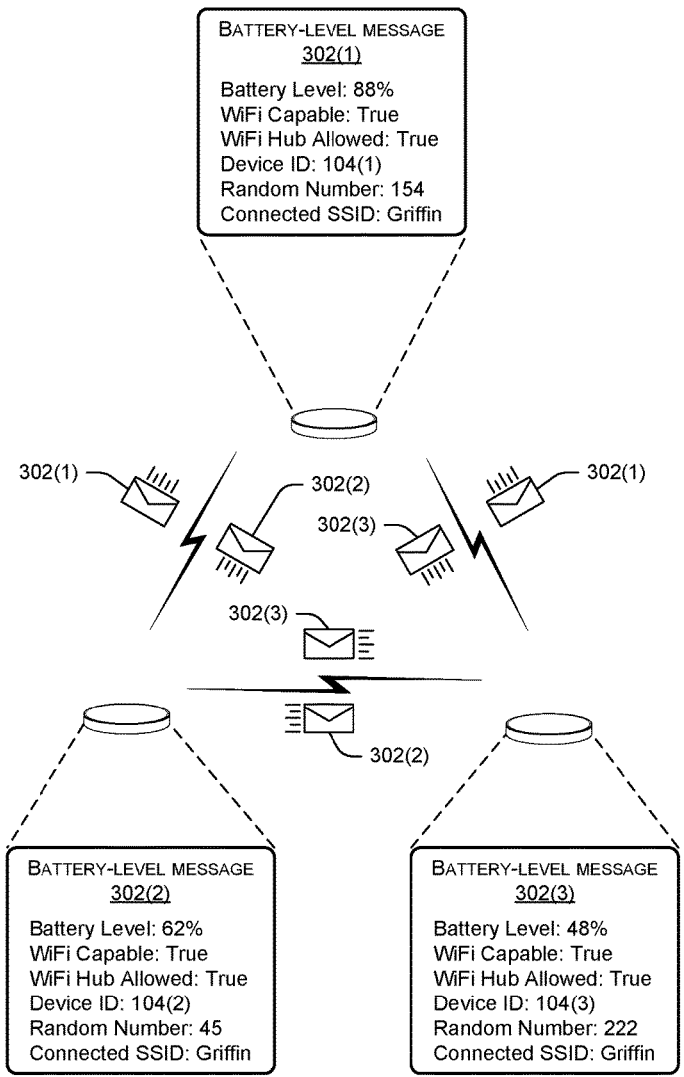
FIG. 3 illustrates example battery-life messages that the devices may generate and send to one another via the device's respective second radios. As illustrated, each hub-selection message may indicate a battery level of the respective device, which may be used to select which device is to act as the communication hub.

FIG. 3 illustrates example battery-life messages 302(1), 302(2), and 302(3) that the devices may generate and send to one another via the device's respective second radios 206(1)-(3). As illustrated, each battery-life message 302(1)-(3) may indicate a battery level of the respective device, which may be used to select which device is to act as the communication hub, along with additional information. For instance, the battery-life message 302(1) indicates a current battery level of the first device 104(1), whether the first device 104(1) is WiFi capable, whether the first device 104(1) is configured to act as a communication hub (e.g., as determined by a user of the device), a DID of the first device 104(1) (e.g., a MAC address, IP address, serial number, etc.), a random number generated by the first device 104(1) at the time of the generating of the battery-level message 302(1), and an SSID of the WLAN to which the first radio 204(1) currently connects to. In some instances, the battery-life messages may take the form of the example structure shown immediately below for battery-life message 302(1):

{
Battery_Level: 88%
WiFi_Capability: True
WiFi_Hub_Allowed: True
DEVICE_ID: 104(1)
RANDOM_NUMBER: 154
CONNECTED_SSID: Griffin
}

In this example, the battery-life message 302(1) indicates that the current battery level of the battery of the first device 104(1) is 88%, the first device is WiFi enabled and configured to act as the communication hub, the example DID of the first device is "104(1)", the generated random number is 154, and the SSID is entitled "Griffin". While FIG. 3 illustrates battery-life messages, it is to be appreciated that the devices may be configured to send messages having information that additionally or alternatively includes other information, such as respective connection strengths of the devices or the like.

The battery-life message 302(2), meanwhile, indicates that the battery level of the battery of the second device 104(2) is 62%, the second device is WiFi enabled and configured to act as the communication hub, the example DID of the second device is "104(2)", the generated random number is 45, and the SSID is entitled "Griffin". Finally, the battery-life message 302(3) indicates that the battery level of the battery of the third device 104(3) is 48%, the third device is WiFi enabled and configured to act as the communication hub, the example DID of the third device is "104(3)", the generated random number is 222, and the SSID is entitled "Griffin". As illustrated, each of the devices 104(1)-(3) may sends its respective battery-life message to each other device in the piconet 108. For instance, the first device 104(1) may send its message 302(1) over its second radio to the second device and the third device, the third device may send its message 302(2) to the first device and the third device, and the third device may send its message 302(3) to the first and second devices. Further, while FIG. 3 illustrates the three devices 104(1)-(3), it is noted that the techniques may apply to environments including any other number of devices. Further, when a new device enters the environment 106 and/or the piconet 108, the new device may begin to periodically broadcast its battery-life message.

Figure 4:
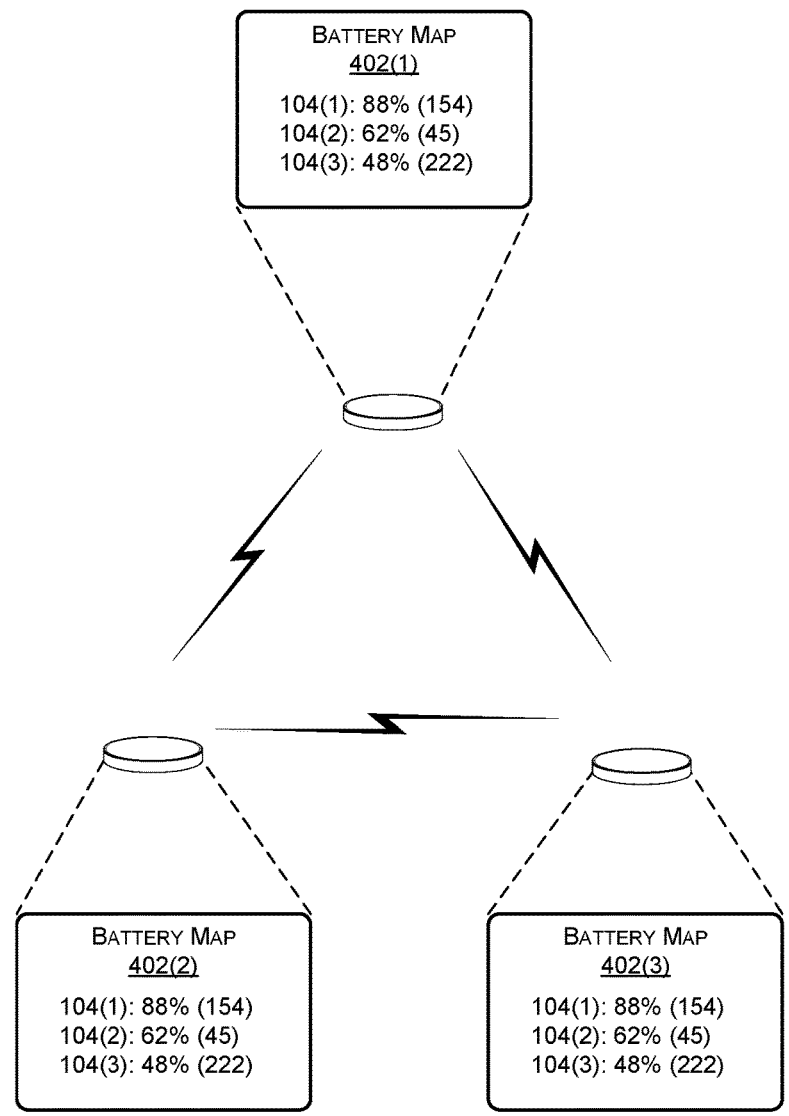
FIG. 4 illustrates an example battery map that each of the devices may generate in response to receiving the battery-life messages of FIG. 3. As illustrated, the battery map may store respective indications of the battery lives of the devices in association with respective device identifiers (DIDs) of the devices.

FIG. 4 illustrates an example battery map 402(1), 402(2), and 402(3) (or "battery map data") that each of the devices 104(1)-(3) may generate in response to receiving the battery-life messages 302(1)-(3). As illustrated, each battery map 402(1)-(3) may store respective indications of the battery lives of the devices in association with respective device identifiers (DIDs) of the devices. For instance, each of the illustrated battery maps indicates that the first device 104(1) having the first DID currently has an 88% battery life, the second device 104(2) having the second DID currently has a 62% battery life, and the third device 104(3) having the third DID currently has a 48% battery life. Further, the battery maps 402(1)-(3) may also indicate the random numbers generated by the respective devices, as FIG. 4 illustrates. Looking at the example battery maps, in this example the first device 104(1) may be selected as the communication hub, given that it has the highest remaining battery life (88%). In instances where the devices instead send information regarding communication strengths, the devices may store one or more maps indicating the current communication strengths of the respective devices. In instances where the devices implement a cost function for selecting a communication hub (e.g., based on battery level and connection strength), the devices may store one or more maps indicating respective function scores of the devices.

Figure 5:
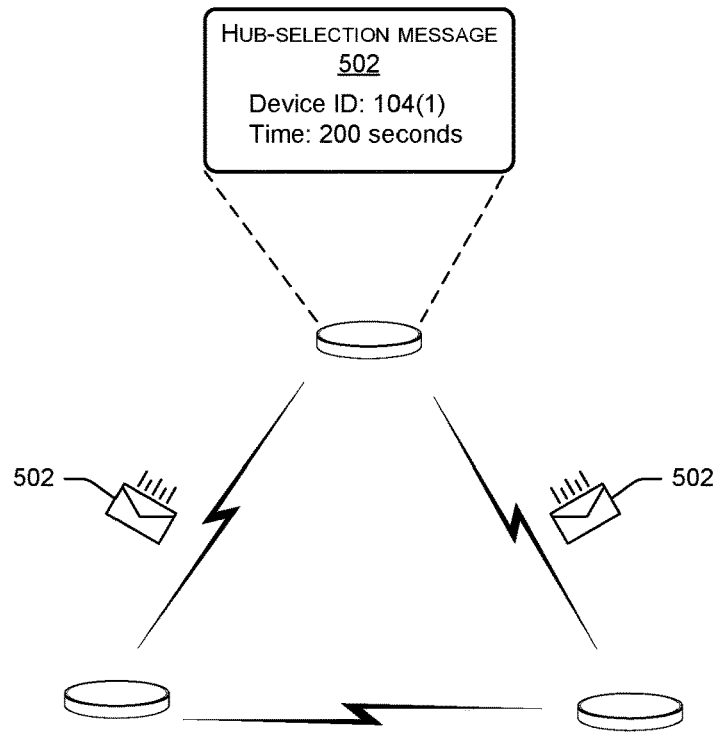
FIG. 5 illustrates an example hub-selection message that one of the devices in the environment may send to the other devices in response to the device determining that it is to act as the communication hub. In some instances, the device with the highest battery level may be selected as the communication hub and may send a message to the other devices indicating that it is going to act as the hub for a specified amount of time.

FIG. 5 illustrates an example hub-selection message 502 that one or more of the devices in the environment may send to the other devices to indicate the current communication hub. While FIG. 5 illustrates the selected communication hub sending this message 502 (in this case the first device 104(1)), in other instances one or more other devices may send this message 502. For instance, one or more of the slave devices may send this message, each of the devices 104(1)-(3) may send this message, the remote system 110 may send this message or the like. As illustrated, the hub-selection message may indicate the DID of the selected communication hub (in this example, the DID of the first device 104(1)), as well as the amount of time for which the selected device is to act as the communication hub. In some instances, this amount of time is preconfigured and constant, while in other instances it may vary depending on battery life, the number of devices in the piconet 108, or the like. In response to receiving the hub-selection message 502, the slave devices 104(2)-(3) may store an indication of the DID of the communication hub as well as the amount of time for which the selected device is to act as the communication hub. The devices 104(1)-(3) may then again send out their respective battery-life messages after expiration of the amount of time or just prior to expiration of this amount of time.

Figure 6:
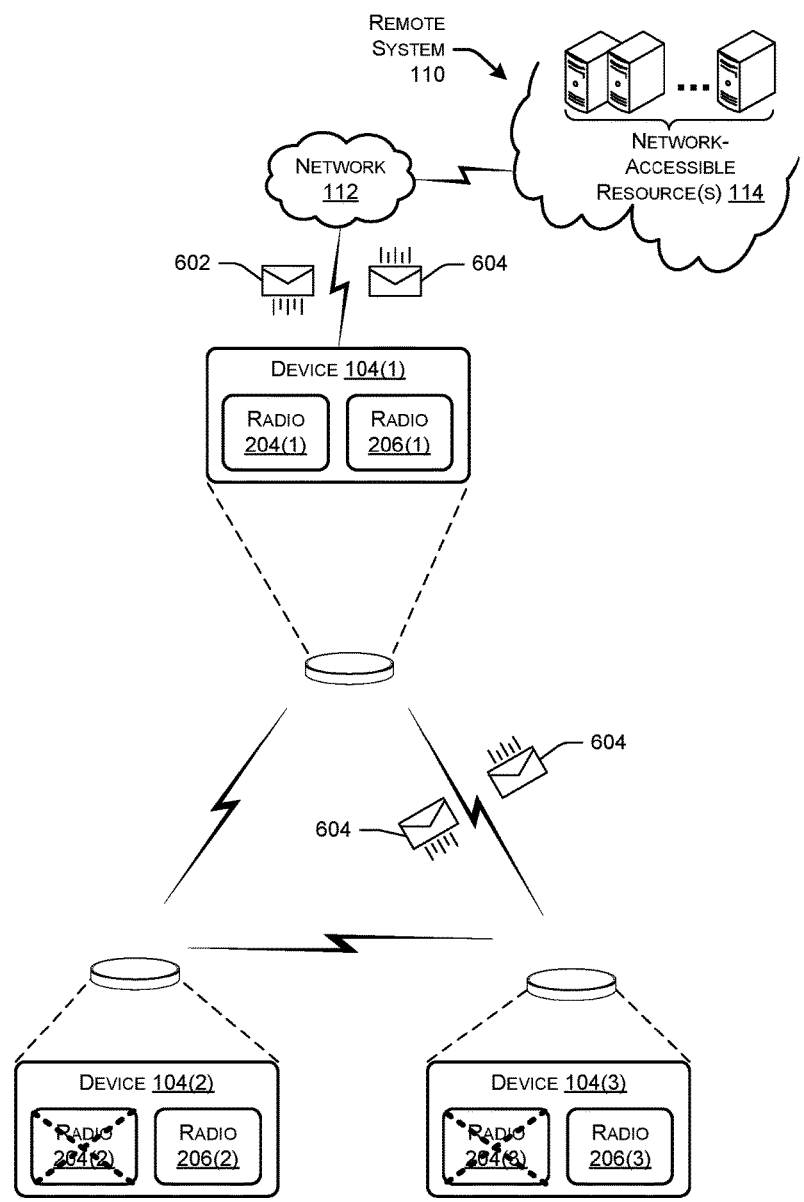
FIG. 6 illustrates the non-communication-hub devices (i.e., slave devices) turning off or placing into low-power mode their first radios. This figure also illustrates one of the slave devices communicating with remote resources via the communication hub by sending information to the communication hub via the slave device's second radio and receiving a response from the communication hub via the second radio. The communication hub, meanwhile, communicates with the remote resources on behalf of the slave device via the first radio of the communication-hub device.

FIG. 6 illustrates that the slave devices 104(2)-(3) may turn off or place into low-power mode their first respective radios 204(1)-(2). That is, because the slave devices 104(2)-(3) may utilize resources of the communication-hub device 104(1) for sending messages to and receiving messages from devices are remote from the environment 106, the slave devices 104(2)-(3) may lessen the power provided to the second radio for the purpose of saving battery life of these devices.

In addition, FIG. 6 also illustrates one of the slave devices 104(3) communicating with remote resources via the communication hub 104(1) by sending information to the communication hub via the slave device's second radio and receiving a response from the communication hub via the second radio. The communication hub, meanwhile, communicates with the remote resources on behalf of the slave device via the first radio of the communication-hub device. As illustrated, the device 104(3) may send a message 602, addressed to the remote service 110, to the first device 104(1) using the second radio of the second device. The second radio of the first device may receive this message 602 and may then send the message 602 to the remote system 110 over the network 112 using the first radio of the first device 104(1). In addition, the remote service 110 may send a response message 604, addressed to the third device 104(3), to the first device 104(1) over the network 112. The first device 104(1) may receive this message 604 via its first radio and may then send the message 604 to the intended third device 104(3) using the second radio of the first device 104(1). The second radio of the third device 104(3) may then receive the message 604.

To provide an example, envision that the user 102 of FIG. 1 presses a button of the third device 104(3), currently acting as a slave device, for the purpose of requesting order of a particular consumer item from the remote service 110 (e.g., paper towels, food, etc.). The device 104(3) may generate a signal representative of this selection, determine that the first device 104(1) is currently acting as the communication hub for the piconet 108, and may send this message to the first device 104(1) using the second radio of the third device 104(3). The first device 104(1) may then send the signal over the network 112 to the remote service 110 using the first radio of the first device 104(1). The remote service may then receive the signal, generate a response signal for output by the third device 104(3), and may send this response back to the first device 104(1) over the network 112. The first device 104(1) may then receive the response using the first radio and may then pass along the message to the third device 104(3) using the second radio. The third device 104(3) may then receive the message via its second radio and may output a response, such as a response audio signal (e.g., a "ding" noise), a visual response (e.g., illuminating a light right of the device 104(3), or the like.

Figure 7A:
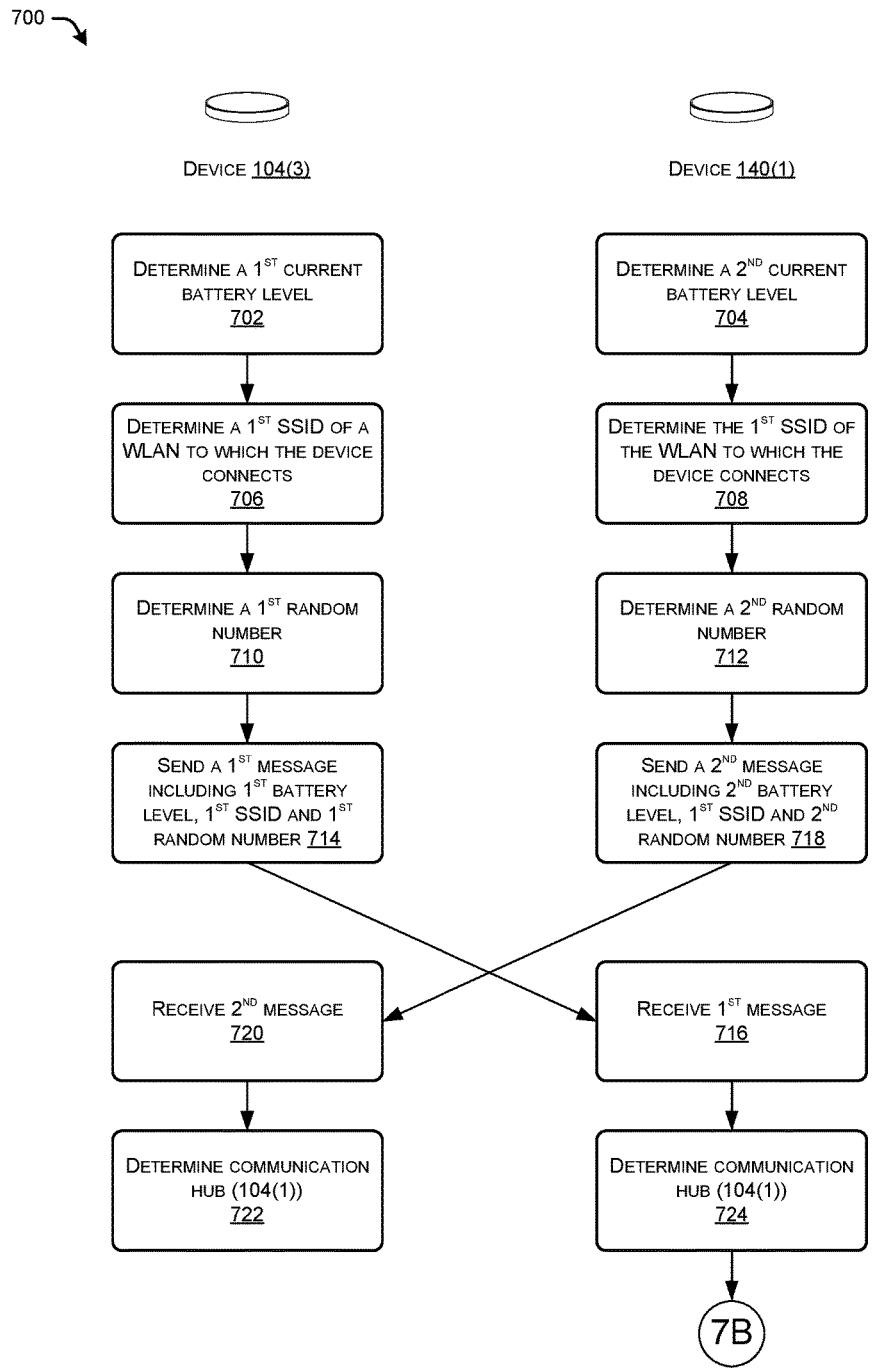
FIGS. 7A-C collectively illustrate a process for selecting which of two (or more) devices is to act as a communication hub for both devices, as well as utilizing the communication hub for messages sent to and/or received from the slave device.
Figure 7B:
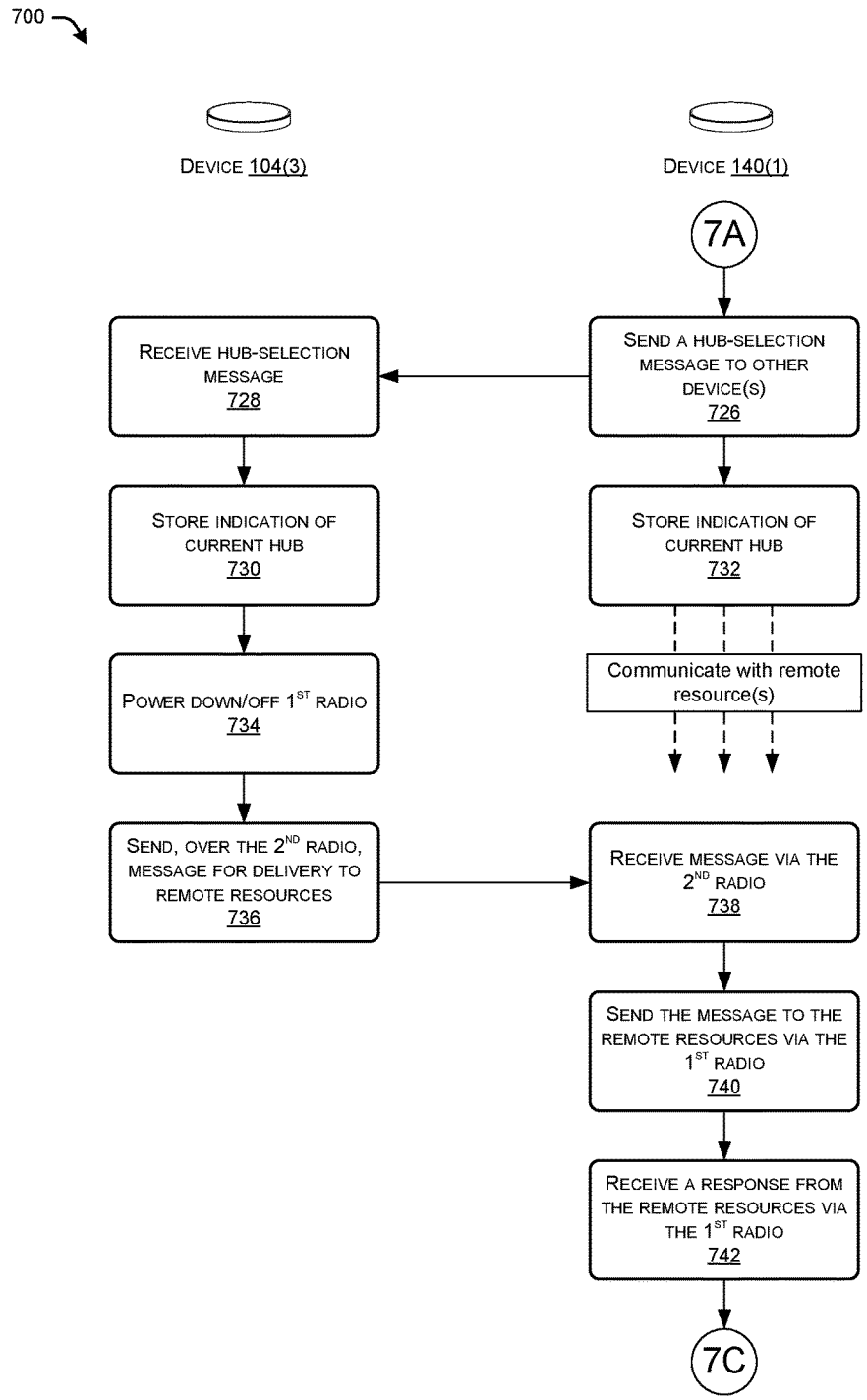
Figure 7C:
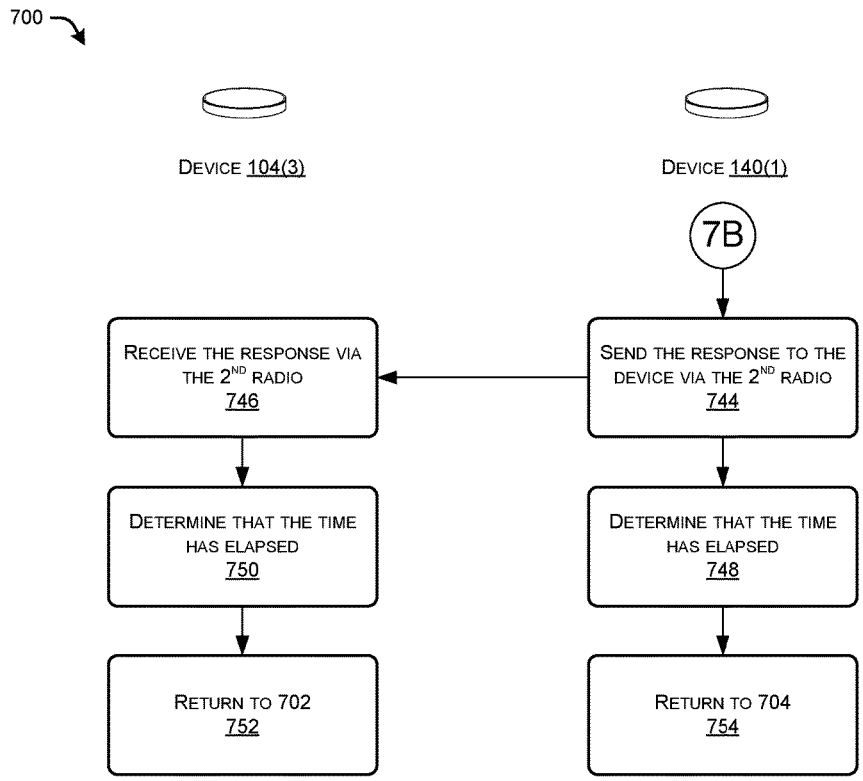

FIGS. 7A-C collectively illustrate a process 700 for selecting which of two (or more) devices is to act as a communication hub for both devices, as well as utilizing the communication hub for messages sent to and/or received from the slave device. The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Further, while the process 700 is illustrated with reference to two devices, it is to be appreciated that the process 700 may apply equally to any other number of devices. Further, while the process 700 describes selecting a communication hub using batter-level information, it is to be appreciated that other factors may be used in selecting a communication hub, as discussed above.

The process 700 begins with the third device 104(3) determining its first current battery level at 702 and the first device 104(1) determining its current second battery level at 704. At 706, the third device 104(3) determines a first SSID of a first WLAN to which the third device 104(3) currently connects to. Similarly, the first device 104(1) determines, at 708, the SSID of the WLAN to which the first device connects, which in this instance is the same WLAN. At 710, the third device 104(3) generates a first random number, while at 712 the first device 104(1) generates a second random number.

At 714, the third device 104(3) sends a first message to the first device over a short-range wireless communication connection. This first message may include an indication of the first battery level, the first SSID, and the first random number. The first device 104(1) receives the first message at 716 and, at 718, sends a second message that includes the second battery level, the first SSID, and the second random number to the third device 104(3), which receives the second message at 720. At 722, the third device 104(3) determines which of the devices is to act as the communication hub. In this example, the third device 104(3) determines that the first device 104(1) is going to act as the communication hub, given that it has the highest battery life of those devices in the piconet (namely the devices 104(1) and 104(3)). At 724, the first device 104(1) makes the same determination.

FIG. 7B continues the illustration of the process 700 and includes, at 722, the first device 104(1) sending a hub-selection message to the other devices in the piconet, the message indicating that the first device 104(1) is to act as the communication hub as well as an indication of an amount of time for which the device is to act as the hub. At 728, the third device 104(3) receives the hub-selection message and, at 730, stores an indication of the current hub. The third device 104(3), as well as any other slave devices in the piconet, may send an acknowledgment message indicating that it confirms receipt of the indication that the first device 104(1) is acting as the communication hub. At 732, the first device stores the same indication, while beginning to communicate with remote resources as needed, both on its own behalf as well as on behalf of other devices in the piconet.

At 734 the third device 104(3) powers down or off the first radio that is configured to communicate over the WLAN, given that the first device 104(1) will make these communications on behalf of the third device 104(3). At 736, the third device 104(3) sends, over its second radio and to the first device 104(1) acting as the communication hub, a message addressed to one or more remote resources. At 738, the first device 104(1) receives the message via its second radio and, at 740, sends the message to the remote resources over the first radio of the first device 104(1). The first device 104(1) may also send an acknowledgment of the message to the third device 104(3) (as well as in response to any other message requests from other slave devices). In some instances, if the communication hub (here, the first device 104(1)) does not send an acknowledgment, the third device may power on or up the WLAN radio and send the message itself. At 742, in this example the first device 104(1) does in fact send the message on behalf of the third device 104(3) and receives a response from the remote resources via the first radio of the first device 104(1).

FIG. 7C concludes the illustration of the process 700 and includes, at 744, sending the response to the third device 104(3) using the second radio of the first device 104(1). At 746, the third device 104(3) receives the message using its second radio and. At 748 and 750, respectively, the first device 104(1) and the third device 104(3) may determine that the amount of time for which the first device 104(1) was scheduled to act as the communication hub has elapsed. Again, this determination may be made based on expiration of a local timer on each device, based on a message from one of the devices to another, based on a message from the remote service 110, and/or a combination thereof. For instance, each device may set a timer or, in some instances, a single device may set the timer and may notify the other devices when the timer expires. For instance, the device acting as the communication hub may set a timer and notify the other devise upon expiration of the predefined amount of time. In another example, a remote server may set the timer and notify the devices when the time elapses. At 752, the third device 104(3) returns to the operation 702 to determine its current battery life and so forth, while at 754 the first device 104(1) returns to operation 704 to determines its new current battery life and so on.

Figure 8A:
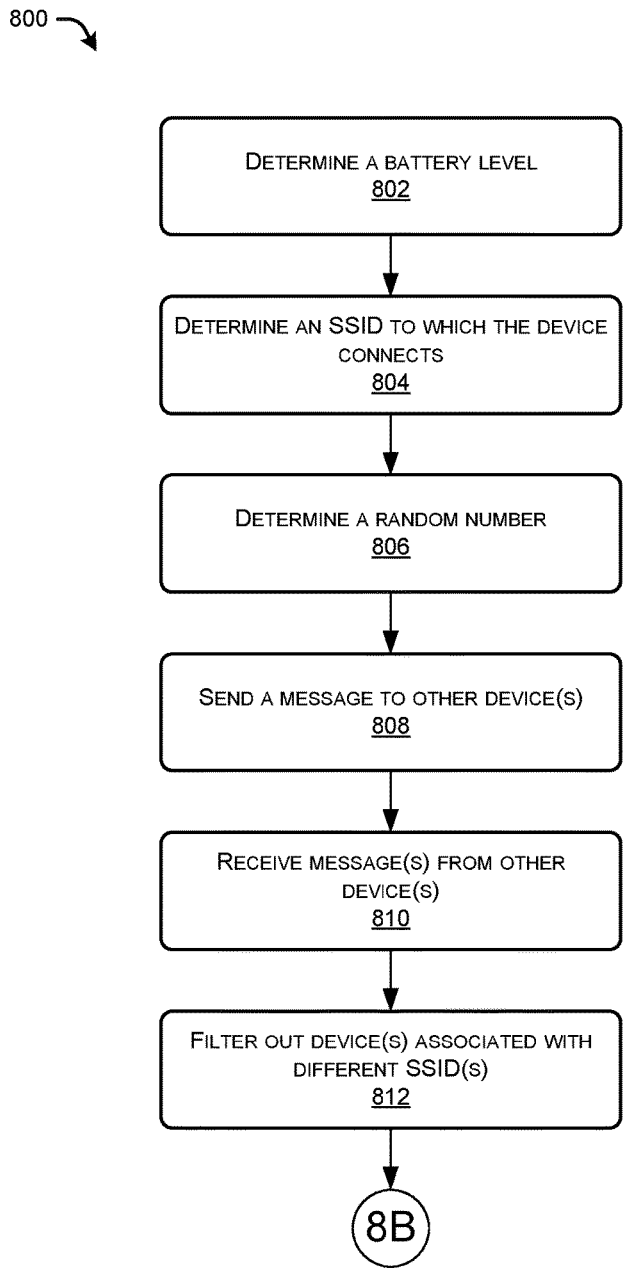
FIGS. 8A-B illustrates a flow diagram of another example process for selecting a device to act as a communication hub for one or more devices based at least in part on the respective battery lives of the devices.
Figure 8B:
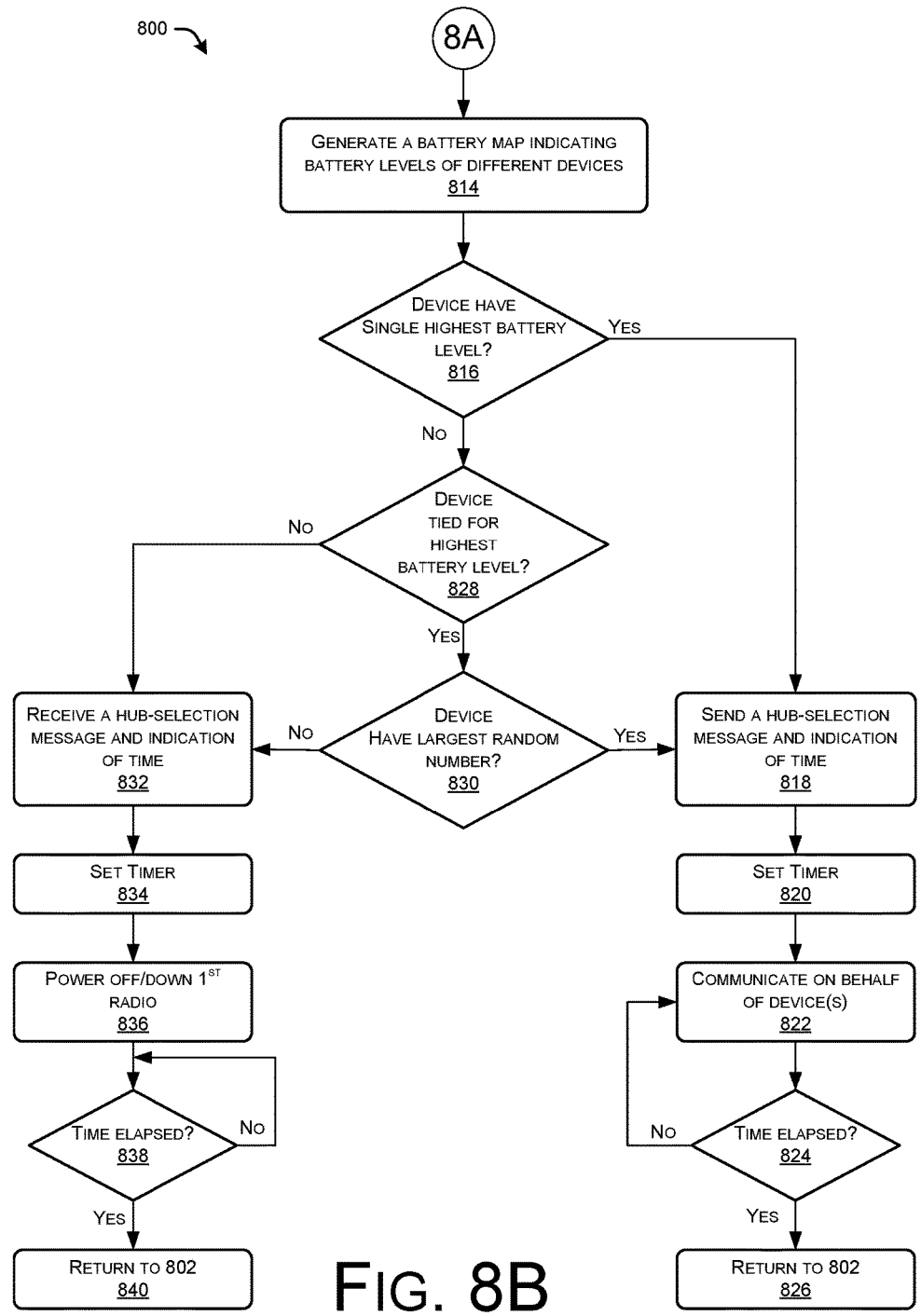

FIGS. 8A-B illustrates a flow diagram of another example process 800 for selecting a device to act as a communication hub for one or more devices based at least in part on the respective battery lives of the devices. In some instances, the process 800 is performed by a device forming a portion of a piconet 108, such as one of the devices 104(1)-(3). Again, while FIG. 8 describes selecting a communication hub using at least battery levels of the devices, other factors may additionally or alternatively be used.

At 802, the device determines a current battery level its battery that is powering the device. At 804, the device then determines an SSID of a WLAN to which it connects and, at 806, generates or otherwise determines at random number. At 808, the device sends a message to one or more other devices in the piconet, with this message including the current battery life, the SSID, the random, and/or other information, such as the DID of the device, whether the device is WiFi enabled, whether the device has permission to act as a communication hub for the piconet, and/or the like.

At 810, the device receives one or more other similar messages from other device(s) in the piconet. For instance, the messages may indicate the battery levels, SSIDs, random numbers, DIDs, and the like of the other devices in the piconet. At 812, the device filters out devices associated with different SSIDs. That is, the device that receives the messages may filter out those DIDs that are currently coupled to a different SSID as the subject device. Filtering out these devices may avoid a situation where a device that is within range of another device, but that resides in a different environment (e.g., a neighbor's house), acts as a communication hub for the subject device. Stated otherwise, this ensure that only devices that are connected to the same WLAN will act as communication hubs on behalf of one another. In addition to filtering out DIDs that couple to different WLANs, the device may filter out, as it pertains to hub selection, those devices that are not WiFi enabled or are not configured to act as a communication hub. In other instances, meanwhile, the device may filter out devices based on a customer account to which the devices are associated. For instance, each device may store an indication of those devices (and their identifiers) that are associated with a particular customer account and may filter out information from devices having identifiers that are not associated with that account. Given that a customer may utilize multiple WLANs with different SSIDs, filtering in this manner may ensure that devices associated with a common customer account are not filtered out.

FIG. 8B continues the illustration of the process 800 and includes, at 814, the device generating a battery map indicating the battery level of those devices for which messages have been received but have not been filtered out. At 816, the device determines whether it has the single highest battery life of the DIDs listed in the battery map. In instances where the selection is based on connection strength, the hub-selection module may instead determine whether the respective device has the highest connection strength. In instances where the selection is based on a cost-function (e.g., based on battery level and connection strength), the hub-selection module may determine if the device has the highest weighted sum. Further, prior to making any or all of these determinations, the hub-selection module of the respective device may determine if it is eligible for selection as the communication hub based on, for instance, having a threshold battery level, connection strength, and/or the like.

If so, then at 818 the device sends a hub-selection message to the other devices in the piconet, indicating that the device is to act as the communication hub, and an indication of the amount of time for which the device is to act as the hub. At 820, the device may then set a timer for the amount of time and, at 822, may continue to communicate to remote resources on its own behalf and on behalf of the other devices in the piconet. At 824, the device queries whether the amount of time has elapsed. If not, the device continues to act as the communication hub for the piconet until the time elapses, at which point at 826 the device returns to operation 802 to determine its new current battery life and so forth.

If, however, at 816 the device determines from the battery map that it does not have the highest single battery level, the device queries whether it is tied for the highest battery level with one or more other devices. In some instances, being tied may denote having the same battery level (e.g., 90% remaining), a battery level within a threshold of one another (e.g., within 5% of one another, etc.), or the like. In any event, if the device determines that it is tied with one or more other devices in the piconet for the highest battery level, then at 830 the device determines whether it has the highest generated random number. If so, then at 818 the device selects itself as the communication hub and sends a hub-selection message to the other devices in the piconet.

If, however, the device does not have the highest generated random number of the devices tied for the highest battery level, or if the device is not tied for the highest battery level, then at 832 the device receives a hub-selection message from another device and indication of an amount of time for which the other device is to act as the hub. At 834, the device sets a time for the amount of time and, at 836, powers off or places into a low-power mode the first radio typically used to communicate over a WLAN, thus saving battery life of the device. At 838, the device queries whether the amount of time has elapsed and, upon determining that it is has, at 840 the device returns to the operation 802 for again determining its current battery life and so forth.

Figure 9:
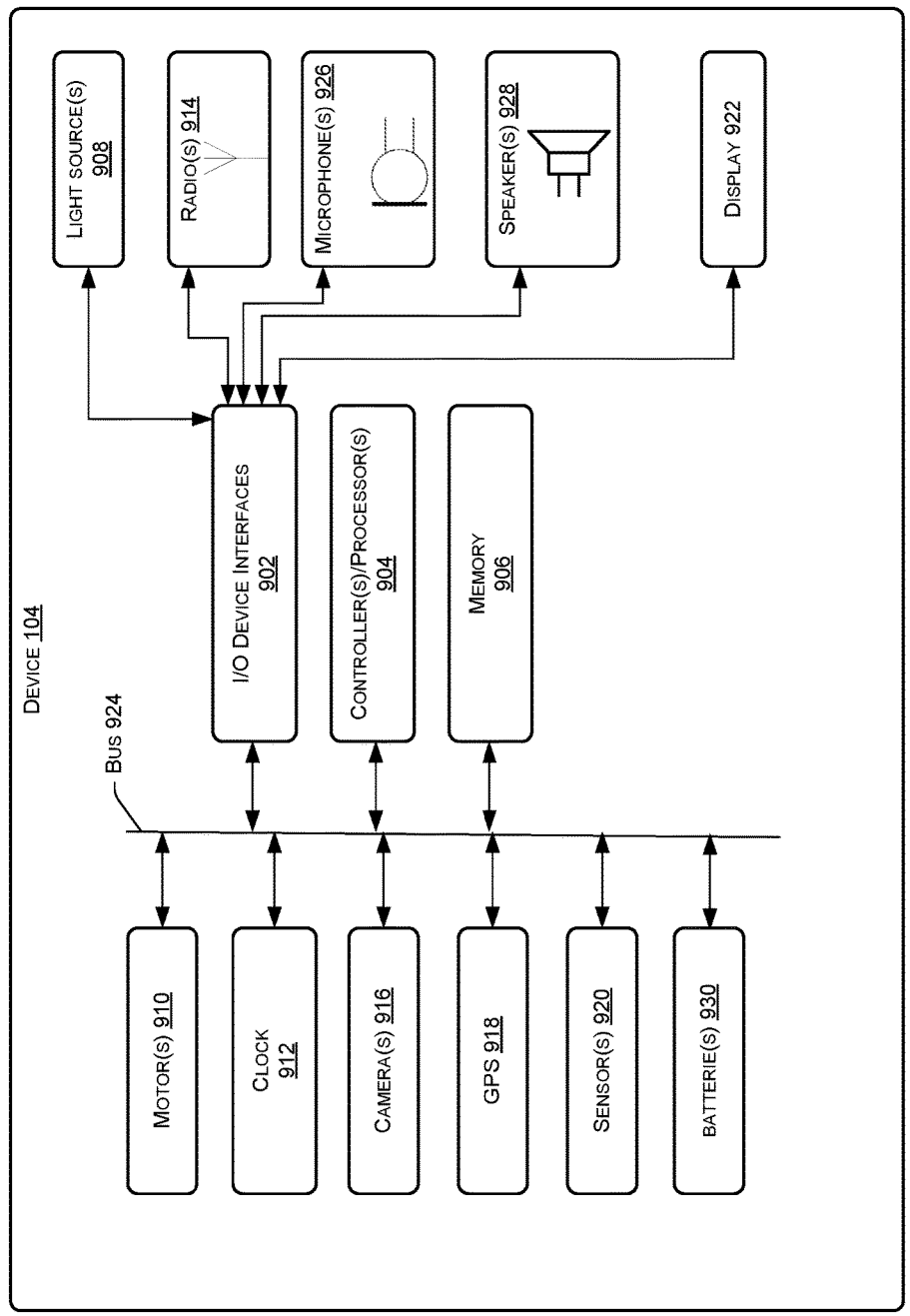
FIG. 9 is a block diagram conceptually illustrating example components of a device, such as those shown in FIG. 1.

FIG. 9 is a block diagram conceptually illustrating example components of a device 104, such as those devices shown in FIG. 1. As illustrated, the device 104 may include one or more I/O device interfaces 902 and one or more processors 904, which may each include a central processing unit (CPU) for processing data and computer-readable instructions. In addition, the device 104 may include memory 906 for storing data and instructions of the respective device. The memory 906 may individually include volatile random access memory (RAM), non-volatile read only memory (ROM), non-volatile magnetoresistive (MRAM) and/or other types of memory. The device 104 may also include a data storage component for storing data and controller/processor-executable instructions. Each data storage component may individually include one or more non-volatile storage types such as magnetic storage, optical storage, solid-state storage, etc. The device 104 may also connect to removable or external non-volatile memory and/or storage (such as a removable memory card, memory key drive, networked storage, etc.) through the respective input/output device interfaces 902.

Computer instructions for operating the device 104 and its various components may be executed by the respective device's processor(s) 904, using the memory 906 as temporary "working" storage at runtime. The computer instructions of the device 104 may be stored in a non-transitory manner in non-volatile memory 906, storage 908, or an external device(s). Alternatively, some or all of the executable instructions may be embedded in hardware or firmware on the respective device 10 in addition to or instead of software.

As illustrated, the device 104 includes the input/output device interfaces 902. A variety of components may be connected through the input/output device interfaces 902. Additionally, the device 104 may include an address/data bus 924 for conveying data among components of the respective device. Each component within the device 104 may also be directly connected to other components in addition to (or instead of) being connected to other components across the bus 924.

The device 104 may also include a display 922, which may include any suitable display technology, such as liquid crystal display (LCD), organic light emitting diode (OLED), electrophoretic, and so on. Furthermore, the processor(s) 904 can comprise graphics processors for driving animation and video output on the associated displays 922. Or, the device 104 may be "headless" and may primarily rely on spoken commands for input. As a way of indicating to a user that a connection between another device has been opened, the device 104 may be configured with one or more visual indicator, such as the light source(s) 908 of the device 104, which may be in the form of an LED(s) or similar component, that may change color, flash, or otherwise provide visible light output. The device 104 may also include the input/output device interfaces 902 that connect to a variety of components such as an audio output component such as a speaker 938 for outputting audio (e.g., audio corresponding to audio content, a text-to-speech (TTS) response, etc.), a wired headset or a wireless headset or other component capable of outputting audio. A wired or a wireless audio and/or video port may allow for input/output of audio/video to/from the device 104. The device 104 may also include an audio capture component. The audio capture component may be, for example, a microphone 926 or array of microphones, a wired headset or a wireless headset, etc. The microphone 926 may be configured to capture audio. If an array of microphones is included, approximate distance to a sound's point of origin may be performed using acoustic localization based on time and amplitude differences between sounds captured by different microphones of the array. The device 104 may be configured to generate audio data corresponding to detected audio. The device 104 (using input/output device interfaces 902, radio(s) 914, etc.) may also be configured to transmit the audio data to the remote system 112 for further processing or to process the data using internal components. In some configurations, the device 104 may be similarly configured to generate and transmit audio data corresponding to audio detected by the microphone(s) 926.

Via the radio(s) 914, the input/output device interfaces 902 may connect to one or more networks 112 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 104 via wired connection to an external alternating current (AC) outlet, and/or via one or more onboard batteries 922. The batteries 922 may comprise any sort of electrochemical cells with external connections to power the device 104. For instance, the batteries 922 may include alkaline batteries, disposable batteries, rechargeable batteries, lead-acid batteries, lithium-ion batteries, and/or the like. As described above, the batteries may drain with time and use and, thus, may at any point in time have a charge that is somewhere between fully charged (i.e., 100% of charge) and fully depleted or dead (i.e., 0% of charge).

The device may further include a clock 912, input devices such as a camera 916, a GPS unit 918, or one or more other sensors 920. These sensors may be used for various purposes, such as accelerometers for movement detection, temperature sensors (e.g., to issue warnings/notifications to users in the vicinity of the accessory, and other types of sensors 918. The GPS 918 receiver can be utilized for location determination of the device 104.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A first electronic device comprising:
   a first radio component configured to communicate over a wireless local area network (WLAN);
   a second radio component configured to communicate over a personal area network (PAN);
   a first battery configured to power the electronic device;
   one or more processors; and
   one or more computer-readable media storing computer-executable instructions that, when executed, cause the one or more processors to perform acts comprising:
   determining a first battery level value of the first battery;
   determining a first service set identifier (SSID) of a first WLAN to which the first radio component communicatively couples;
   sending, via the second radio component, a first message to a second electronic device, the first message indicating at least: (i) a first device identifier (DID) of the first electronic device, (ii) the first battery level value, and (iii) the first SSID;
   receiving, from the second electronic device and via the second radio component, a second message, the second message indicating at least: (i) a second DID of the second electronic device, (ii) a second battery level value of a second battery that powers the second electronic device, and (iii) the first SSID of the first WLAN to which the second electronic device also couples;
   generating battery map data based at least in part on determining that both the first and second electronic devices couple to the first WLAN associated with the first SSID, the battery map data comprising: (i) an indication of the first battery level value of the first electronic device associated with the first DID, and (ii) an indication of the second battery level value of the second electronic device associated with the second DID;
   determining that the first battery level value is greater than the second battery level value; and
   sending, via the second radio component, a third message to the second electronic device, the third message indicating at least that the first electronic device is to be a communication hub for the second electronic device.

2. The first electronic device as recited in claim 1, the acts further comprising:
   receiving, via the second radio component, a fourth message from the second electronic device, the fourth message addressed to one or more remote computing devices;
   sending, via the first radio component, the fourth message to the one or more remote computing devices;
   receiving, via the first radio component, a fifth message addressed to the second electronic device; and
   sending, via the second radio component, the fifth message to the second electronic device.

3. The first electronic device as recited in claim 1, wherein:
   the sending the third message further comprises sending the third message further indicating an amount of time for which the first electronic device is to be the communication hub; and
   the generating the battery map data comprises generating first battery map data;
   and the acts further comprising:
   determining that the amount of time has elapsed;
   determining a third battery level value of the first battery;
   sending, via the second radio component, a fourth message, the fourth message indicating at least: (i) the first DID, (ii) the third battery level value, and (iii) the first SSID;
   receiving, via the second radio component, a fifth message, the first fifth message indicating at least: (i) the second DID (ii) a fourth battery level value of the second battery, and (iii) the first SSID;

generating second battery map data, the second battery map data comprising: (i) an indication of the third battery level value of the first electronic device associated with the first DID, and (ii) an indication of the fourth battery level value of the second electronic device associated with the second DID;

determining that the fourth battery level value is greater than the third battery level value;

receiving, via the second radio component, a sixth message from the second electronic device, the sixth message indicating at least that the second electronic device is to be a communication hub for the first electronic device; and at least one of powering off the first radio component or placing the first radio component in a low-power mode.

4. The first electronic device as recited in claim 1, wherein:

the sending the third message further comprises sending the third message further indicating an amount of time for which the first electronic device is to be the communication hub; and the generating the battery map data comprises generating first battery map data;

and the acts further comprising:

determining that the amount of time has elapsed;

determining a third battery level value of the first battery;

generating a first random number;

sending, via the second radio component, a fourth message, the fourth message indicating at least: (i) the first DID (ii) the third battery level value, (iii) the first SSID, and (iv) the first random number;

receiving, via the second radio component, a fifth message, the first message indicating at least: (i) the second DID (ii) a fourth battery level value of the second battery, (iii) the first SSID, and (iv) a second random number generated by the second electronic device;

generating second battery map data, the second battery map data comprising: (i) an indication of the third battery level value of the first electronic device associated with the first DID, and (ii) an indication of the fourth battery level value of the second electronic device associated with the second DID;

determining that the third battery level value is substantially equal to the fourth battery level value;

determining that the second random number is greater than the first random number;

receiving, via the second radio component, a sixth message from the second electronic device, the sixth message indicating at least that the second electronic device is to be a communication hub for the first electronic device; and at least one of powering off the first radio component or placing the first radio component in a low-power mode.

5. The first electronic device as recited in claim 1, the acts further comprising:

receiving, from a third electronic device and via the second radio component, a fourth message, the fourth message indicating at least: (i) a third DID of the third electronic device, (ii) a third battery level value of a third battery that powers the third electronic device, and (iii) a second SSID of a second WLAN to which the third electronic device couples; and determining to exclude information regarding the third battery level value of the third electronic device in response to the second SSID differing from the first SSID.

6. A first electronic device comprising:

at least one first battery configured to power the first electronic device;

one or more processors; and one or more computer-readable media storing computer-executable instructions that, when executed, cause the one or more processors to perform acts comprising:

determining a first battery level value associated with the first battery;

sending a first message to a second electronic device, the first message indicating at least: (i) a first device identifier (DID) of the first electronic device, and (ii) the first battery level value;

receiving a second message indicating at least: (i) a second DID, and (ii) a second battery level value;

generating battery map data based at least in part on the first message, on the second message, and on determining that both the first and second electronic devices couple to a first WLAN associated with a first service set identifier (SSID); and determining that the second electronic device is to be a communication hub for the first electronic device based at least in part on the battery map data.

7. The first electronic device as recited in claim 6, the acts further comprising:

sending, to the second electronic device, a fourth message addressed to one or more remote computing devices; and receiving a fifth message, the fifth message originating from the one or more electronic devices.

8. The first electronic device as recited in claim 6, further comprising:

a first radio component configured to communicate over a first network; and a second radio component configured to communicate over a second network;

and wherein:

the acts further comprise receiving a third message indicating at least that the second electronic device is to be the communication hub for the first electronic device;

the sending the first message comprises sending the first message to the second electronic device using the second radio component;

the receiving the second message comprises receiving the second message from the second electronic device using the second radio component;

the receiving the third message comprises receiving the third message from the second electronic device using the second radio component; and the acts further comprise powering down the first radio component at least partly in response to the receiving of the third message indicating that the second electronic device is to be the communication hub for the first electronic device.

9. The first electronic device as recited in claim 8, wherein:

the first radio component comprises a first radio component configured to communicate over the first WLAN; and the second radio component comprises a second radio component configured to communicate over a personal area network (PAN).

10. The first electronic device as recited in claim 6, the acts further comprising:
   determining the first SSID of the first WLAN to which the first electronic device couples,
   wherein:
      the battery map data comprises (i) an indication of the first battery level value of the first electronic device associated with the first DID, and (ii) an indication of the second battery level value of the second electronic device associated with the second DID; and
      the receiving of the second message comprises receiving the second message further indicating the first SSID of the first WLAN that the second electronic device also couples.

11. The first electronic device as recited in claim 10, the acts further comprising:
   receiving a fourth message indicating at least: (i) a third DID of a third electronic device, (ii) a third battery level value of a third battery that powers the third electronic device, and (iii) a second SSID of a second WLAN that the third electronic device couples to,
   wherein the battery map data excludes an indication of the third battery level value based at least in part on the second SSID indicating that the third electronic device couples to the second WLAN.

12. The first electronic device as recited in claim 6, the acts further comprising:
   receiving a third message indicating at least that the second electronic device is to be the communication hub for the first electronic device,
   wherein:
   the receiving of the third message comprises receiving the third message from the second electronic device further indicating an amount of time the second electronic device is to be the communication hub;
   the acts further comprise:
      determining that the amount of time has elapsed;
      determining a third battery level value of the first battery;
      generating a first random number;
      sending a fourth message to the second electronic device, the fourth message indicating at least: (i) the first DID, (ii) the third battery level value, and (iii) the first random number; and
      receiving a fifth message from the second electronic device, the fifth message indicating at least: (i) the second DID, (ii) a fourth battery level value of the second electronic device, and (iii) a second random number generated by the second electronic device; and
   the battery map data comprises (i) an indication of the third battery level value of the first electronic device associated with the first DID and the first random number, and (ii) an indication of the fourth battery level value of the second electronic device associated with the second DID and the second random number.

13. The first electronic device as recited in claim 12, wherein determining that the second electronic device is to be the communication hub for the first electronic device based at least in part on the battery map data comprises:
   determining that the third battery level value is substantially equal to the fourth battery level value;
   determining that the first random number is greater than the second random number; and
   sending a sixth message to the second electronic device indicating at least that the first electronic device is to be a communication hub for the second electronic device.

14. The first electronic device as recited in claim 6, wherein:
   the sending further comprises sending the first message indicating a first connection strength of the first device to the first WLAN;
   the receiving the second message further comprises receiving the second message indicating a second connection strength of the second device to the first WLAN;
   the battery map data comprises an indication of the second battery value and an indication of the second connection strength; and
   determining that the second electronic device is to be the communication hub for the first electronic device based at least in part on the battery map data comprises selecting the second device as the communication hub based at least in part on at least one of the second battery level value or the second connection strength.

15. A method implemented at least in part by a first electronic device, the method comprising:
   determining, by a first electronic device, a first battery level value of a first battery powering the first electronic device;
   sending a first message to a second electronic device, the first message indicating at least: (i) a first device identifier (DID) of the first electronic device, and (ii) the first battery level value;
   receiving a second message indicating at least: (i) a second DID of the second electronic device, and (ii) a second battery level value of a second battery that powers the second electronic device;
   generating battery map data based at least in part on the first message, on the second message, and on determining that both the first and second electronic devices couple to a first wireless local area network (WLAN) associated with a first service set identifier (SSD); and
   determining that the second electronic device is to be a communication hub for the first electronic device based at least in part on the battery map data.

16. The method as recited in claim 15, further comprising:
   sending, to the second electronic device, a fourth message addressed to one or more remote computing devices; and
   receiving a fifth message, the fifth message originating from the one or more electronic devices.

17. The method as recited in claim 15, further comprising:
   receiving a third message indicating at least that the second electronic device is to be the communication hub for the first electronic device,
   wherein:
   the sending the first message comprises sending the first message to the second electronic device using a first radio component of the first electronic device, the first radio component configured to communicate over a personal area network (PAN);
   the receiving the second message comprises receiving the second message from the second electronic device using the first radio component;
   the receiving the third message comprises receiving the third message from the second electronic device using the first radio component; and
   the method further comprises powering down a second radio component of the first electronic device, the second radio component configured to communicate over the first WLAN.

18. The method as recited in claim 15, further comprising:
determining the first SSID of the first WLAN to which the first electronic device couples,
wherein:
the battery map data comprises: (i) an indication of the first battery level value of the first electronic device associated with the first DID, and (ii) an indication of the second battery level value of the second electronic device associated with the second DID; and
the receiving of the second message comprises receiving the second message further indicating the first SSID of the first WLAN that the second electronic device also couples to.

19. The method as recited in claim 18, the acts further comprising:
receiving a fourth message indicating at least: (i) a third DID of a third electronic device, (ii) a third battery level value of a third battery that powers the third electronic device and, (iii) a second SSID of a second WLAN that the third electronic device couples;
and wherein the battery map data excludes an indication of the third battery level value based at least in part on the second SSID indicating that the third electronic device couples to the second WLAN.

20. The method as recited in claim 15, wherein:
the sending further comprises sending the first message indicating a first connection strength of the first device to the first WLAN;
the receiving the second message further comprises receiving the second message indicating a second connection strength of the second device to the first WLAN;
the battery map data comprises an indication of the second battery value and an indication of the second connection strength; and
determining that the second electronic device is to be the communication hub for the first electronic device based at least in part on the battery map data comprises selecting the second device as the communication hub based at least in part on at least one of the second battery level value or the second connection strength.

\* \* \* \* \*